United States Patent
Thaniyath et al.

(10) Patent No.: US 8,712,114 B2
(45) Date of Patent: Apr. 29, 2014

(54) ELEGANT SOLUTIONS FOR FINGERPRINT IMAGE ENHANCEMENT

(71) Applicant: Texas Instruments Incorporated, Dallas, TX (US)

(72) Inventors: Shajil Asokan Thaniyath, Thrissur (IN); Santhosh Kumar Trichur Natarajan, Plano, TX (US); Raja Narsimham Lalith Kumar Kummariguntla, AndhraPradesh (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/735,165

(22) Filed: Jan. 7, 2013

(65) Prior Publication Data

US 2013/0121607 A1 May 16, 2013

Related U.S. Application Data

(63) Continuation of application No. 12/339,627, filed on Dec. 19, 2008, now abandoned.

(51) Int. Cl.
  *G06K 9/00* (2006.01)
(52) U.S. Cl.
  USPC .......................................................... 382/124
(58) Field of Classification Search
  USPC .................................................. 382/100, 124
  See application file for complete search history.

(56) References Cited

U.S. PATENT DOCUMENTS

| | | | |
|---|---|---|---|
| 7,308,153 B1 * | 12/2007 | Wang et al. ................... | 382/262 |
| 2005/0271260 A1 * | 12/2005 | Hara ............................. | 382/124 |
| 2008/0044095 A1 * | 2/2008 | Albiez .......................... | 382/237 |
| 2008/0095413 A1 * | 4/2008 | Yau et al. ...................... | 382/125 |

OTHER PUBLICATIONS

Hong, Lin, et al.; "Fingerprint Image Enhancement: Algorithm and Performance Evaluation"; Aug. 1998; IEEE Transactions on Pattern Analysis and Machine Intelligence; vol. 20. No. 8.*

* cited by examiner

*Primary Examiner* — Kim Vu
*Assistant Examiner* — Fred Hu
(74) *Attorney, Agent, or Firm* — Robert D. Marshall, Jr.; W. James Brady; Frederick J. Telecky, Jr.

(57) ABSTRACT

This invention includes image processing techniques directed to achieve feature enhancement and background-foreground enhancement in fingerprint images. The image is divided into plural segments depending on the ridge-valley directions. Each segment is separately filtered with a directional filter generally perpendicular to the corresponding ridge-valley direction. Background-foreground detection employs edge detection to identify edge pixels. These edge pixels are averaged to determine a threshold. The threshold is applied to the original image to determine background and foreground pixels. The background and foreground pixels are filtered via a watershed fill filter with separate connectivity for background and foreground pixels.

6 Claims, 5 Drawing Sheets

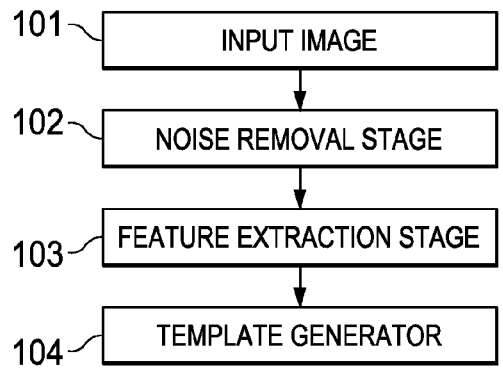
FIG. 1
(PRIOR ART)
| 1/25 | 1/25 | 1/25 | 1/25 | 1/25 |
|------|------|------|------|------|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
FIG. 2
(PRIOR ART)
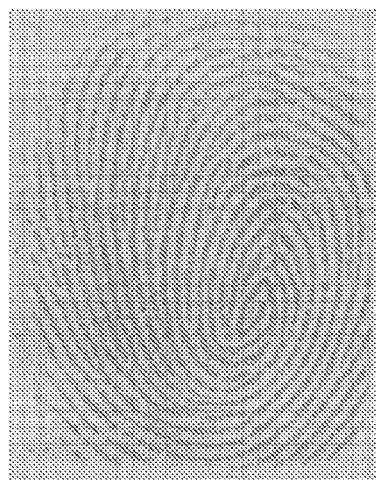
FIG. 3A
(PRIOR ART)
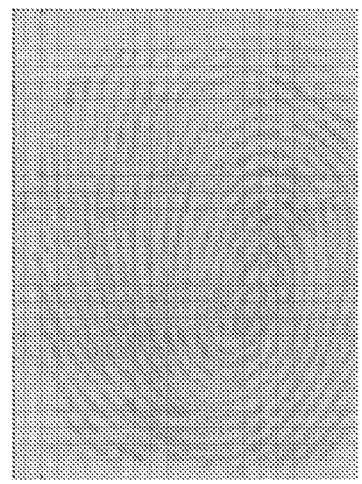
FIG. 3B
(PRIOR ART)

| 0 | 0 | 0 | 0 | 1/5 |
|---|---|---|---|---|
| 0 | 0 | 0 | 1/5 | 0 |
| 0 | 0 | 1/5 | 0 | 0 |
| 0 | 1/5 | 0 | 0 | 0 |
| 1/5 | 0 | 0 | 0 | 0 |
FIG. 4A
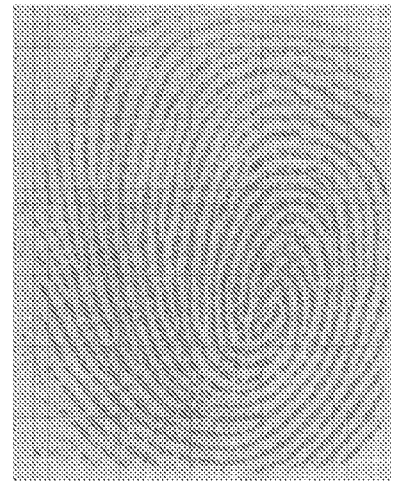
FIG. 4B
FIG. 4C

| 3 | 0 | 0 | 0 | 0 |
|---|---|---|---|---|
| 0 | -1 | 0 | 0 | 0 |
| 0 | 0 | 8 | 0 | 0 |
| 0 | 0 | 0 | -1 | 0 |
| 0 | 0 | 0 | 0 | -3 |
FIG. 6A
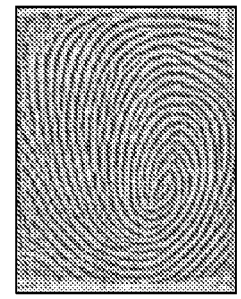
FIG. 6B
1/29
| 3 | 0 | 0 | 0 | 8 |
|---|---|---|---|---|
| 0 | -1 | 0 | 8 | 0 |
| 0 | 0 | 8 | 0 | 0 |
| 0 | 8 | 0 | -1 | 0 |
| 8 | 0 | 0 | 0 | -3 |
FIG. 7A
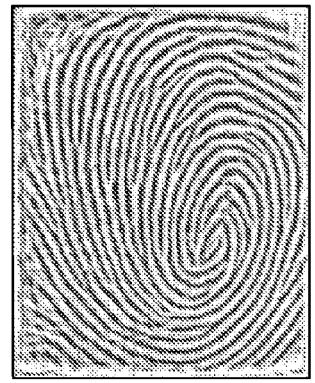
FIG. 7B
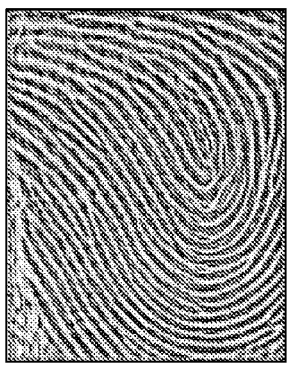
FIG. 9A
FIG. 9B
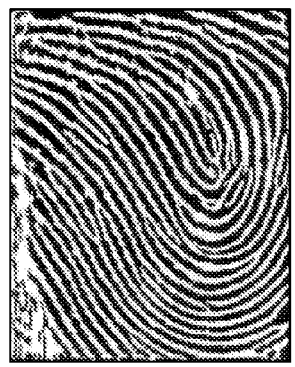
FIG. 9C

ELEGANT SOLUTIONS FOR FINGERPRINT IMAGE ENHANCEMENT

TECHNICAL FIELD OF THE INVENTION

The technical field of this invention is fingerprint imaging.

BACKGROUND OF THE INVENTION

Image processing has been applied to a wide variety of image enhancement issues. There are two crucial problems in fingerprint image analysis. These are feature enhancement and background-foreground segmentation. Current feature enhancement techniques typically target feature points including minute-ridge bifurcations and ridge terminations. These features are the objects most often scrutinized in matching algorithms that extract the feature points on the enrolled fingerprint and attempt to localize the feature point in the input fingerprint.

FIG. 1 illustrates the block diagram of a prior art fingerprint feature point based algorithm. Current techniques first generate a template containing information pertinent to feature points of the fingerprints. These templates are then compared. Image input 101 receives the fingerprint input image. Noise removal stage 102 removes noise from the image input. Feature extraction stage 103 attempts to recognize and extract relevant features form the image. Template generator 104 generates templates for the matching process. Template generator 104 requires a fingerprint input image free from noise so that feature points can be extracted with a high level of confidence.

Fingerprints captured under noisy operational environments including inconsistent contact of finger with sensor, exertion of more than optimal or less than optimal required pressure on the sensor, shear force on the sensor, and sensor defects often tend to lessen the distinction between ridges and valleys. As a result feature extraction stage 103 tends to extract many spurious minutiae. Such spurious minutia degrades the performance of the identification system. Conventional approaches to solve this degradation problem include filtering to reduce ambient noise.

FIG. 2 illustrates the 2D convolution mask conventionally used for low pass filtering the input image. Each pixel of the image is replaced with the weighted average of the neighboring pixels. This removes small-unwanted discontinuities present in the image. This can also blur the image.

Low-pass median filters show excellent performance for images having salt and pepper noise. Unfortunately these filters blur the image reducing the ridge-valley distinction. This effect can be observed in FIG. 3. FIG. 3A is an example input image. FIG. 3B is the corresponding filtered output image.

Detection of ridges and valleys, an important step in the feature extraction process, involves segmentation of the image background (valleys) and foreground (ridges). In conventional techniques a thresholding operation converts a gray-scale image into a black and white image. The threshold can be determined adaptively, but this process is clearly not perfect at all times. Unwanted continuities or discontinuities in the ridge-valley structures often result. This occurs from information loss during color conversion and because thresholding is independent of pixel-neighborhood relationships. Noise added due to this down conversion has to be reduced to achieve accurate feature extraction.

SUMMARY OF THE INVENTION

The present invention describes solutions used in image processing to achieve feature enhancement and background-foreground segmentation. The invention employs adaptive filtering, which has the desirable characteristic of allowing improvement of the image while preserving the ridge valley distinctions. The invention further includes directional filtering which takes into consideration a direction approximate to the ridge and valley orientations in the fingerprint image. This combines the characteristics of the low-pass filters and those of high-pass filters to highlight discontinuities.

BRIEF DESCRIPTION OF THE DRAWINGS

These and other aspects of this invention are illustrated in the drawings, in which:

FIG. 1 illustrates a functional block diagram of a feature point based algorithm (Prior Art);

FIG. 2 illustrates a conventional 2D convolution mask used for low pass filtering the input image (Prior Art);

FIGS. 3A and 3B illustrate the results observed in using low-pass median filters, which are effective in reducing salt and pepper noise in images but cause the image to become blurred reducing the ridge-valley distinction, on an example image (Prior Art);

FIGS. 4A, 4B and 4C illustrate a 45 degree oriented low pass filter mask, an example input image and the result of the using this filter on this input image;

FIGS. 6A and 6B illustrate a modified high pass filter mask including high pass filters oriented perpendicular to ridge-valley lines and the result of using this filter on the example input image;

FIG. 7A illustrates the combined filter mask used for reduction of background-foreground segmentation;

FIG. 7B illustrates the result of an example image filtered using masks oriented along ridge/valley locations;

FIGS. 9A, 9B and 9C illustrate a comparison of an example input image, the thresholded image and the cleaned image after watershed fill operations.

DETAILED DESCRIPTION OF PREFERRED EMBODIMENTS

Adaptive filtering has the desirable characteristic of allowing improvement of the image while preserving the ridge valley distinctions. The invention includes directional filtering combining the characteristics of the low-pass filter and high-pass filters to highlight the discontinuities. These filterings take place during the noise removal stage 102 in the feature point based algorithm illustrated in FIG. 1.

FIG. 4 illustrates a modified low pass filter mask to enhance the image in a selected direction. The example of FIG. 4 uses a 45-degree line through the input fingerprint image. All points on ridges and valleys with orientations in range of 33.5 degrees through 56.0 degrees, 22.5 degrees on either side of 45 degrees, are filtered with masks oriented along the 45 degree line.

FIG. 4A illustrates a directional filter in a 5 by 5 mask array. The current pixel under consideration is at the center pixel of the array. The values in each cell are the weights given to the corresponding neighboring pixel in the weighted sum. The weighted sum of FIG. 4A is ⅕ of the pixel values of the pixels along the South-West to North-East diagonal, that is 45 degrees. The cell value for other pixels is zero, indicating these pixels do not contribute to the weighted sum. The center pixel value is replaced with this weighted sum. Other filter masks are possible including low but non-zero weights for off-axis pixels. FIG. 4B illustrates an example input image. FIG. 4C illustrates the result of the filtering the example image of FIG. 4B by the directional filter of FIG. 4A. Further improvement suppressing small-unwanted discontinuities present in the image resulting from use of the conventional 2D convolution mask of FIG. 2 can be obtained with the following refinement.

This refinement uses the average pixel values in a direction parallel to the ridge and valley orientations in the fingerprint image. This is equivalent to low pass filtering along the ridge-valley orientation. This filtering causes any blurring to be along the direction of ridge orientations markedly preserving the ridge-valley distinction.

Figure 5:
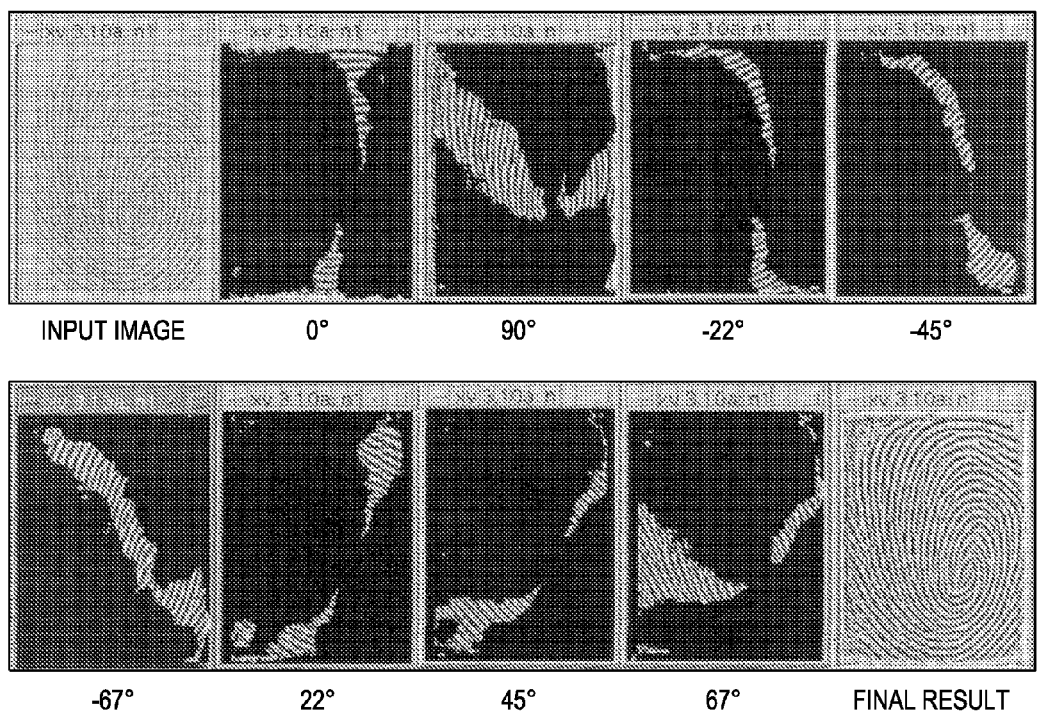
FIG. 5 illustrates an example of image quantization, where the image is separated into eight parts with a 22.5 degree resolution.

The input image is partitioned into a number of parts dependent on ranges of ridge-valley orientation. FIG. 5 illustrates an example implementation including an input image, filtered parts with orientation quantized into eight parts with a resolution of 22.5 degrees and the final resultant filtered image. Filtering the image with modified high pass filters oriented in a direction perpendicular to the ridge-valley orientations enhances the ridge-valley distinctions. As an example, all points on ridges and valleys with orientations in range of approximately 33.5 degrees through 56 degrees (in the neighborhood of 45 degrees) are filtered with masks oriented in direction 90 degrees plus 45 degrees, which equals 135 degrees or −45 degrees. Thus each pixel is replaced with a weighted sum of surrounding pixels. The weighted sum favors neighboring pixels along the ridge-valley line and disfavors pixels perpendicular to this line. FIG. 4A illustrates an example of such a weighted sum for the 45 degree angle. Similar filter masks are produced for the other orientations. This directional filtering tends to low pass filter along the ridge-valley lines while not blurring the ridge-valley distinction. FIG. 5 illustrates the assembled final result of the directional filtering of the separate segments.

FIG. 6A illustrates a modified high pass filter mask with an orientation of 45 degrees. FIG. 6B illustrates the enhanced fingerprint image as filtered by the filter of FIG. 6A.

This invention allows selection of a threshold based on edge-information of the image and complements it with a watershed filling operation to reduce the noise added due to improper image segmentation. Edges of the gray-scale image in the fingerprint ridge-valley boundaries contain pixels whose intensity values are intermediate values between background and foreground. Use of only these pixels to determine the segmentation threshold gives better results as compared to using the entire range of pixels. The invention first marks the edge pixels using conventional edge detection methods. For example, using the Sobel edge detection method, the invention first calculates the threshold of the enhanced image as the average of these marked pixel intensities. The image after segmentation is a black and white image, with a white background and a black foreground. This image segmentation requires the background to be only 4-connected with the nearest horizontal and vertical neighbor pixels. The foreground may have 8-connectivity with all nearest neighbor pixels horizontal, vertical and diagonal included. This information is used to remove the noise due to the thresholding operation.

FIG. 7 illustrates the combined filter mask for reduction of background-foreground segmentation. FIG. 7B illustrates the result of the example image filtered using masks oriented along ridge-valley locations.

Figure 8:
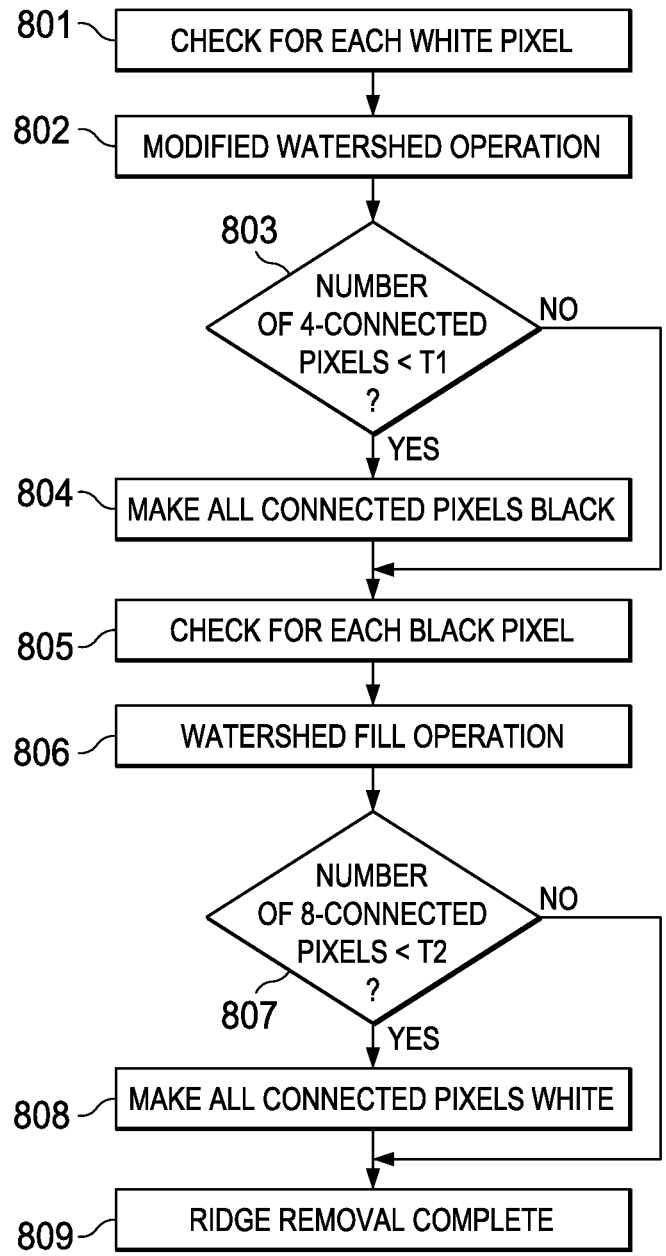
FIG. 8 illustrates a flow chart of the ridge removal process of the invention.

This invention uses the following heuristics with the watershed filling operation. FIG. 8 illustrates the process of removing the discontinuities in ridges after finalizing the binary data requires. Step 801 checks for each white pixel. Step 802 uses the modified watershed fill operation to connect all the four connected white pixels to that pixel.

Step 803 checks to determine whether the number of 4-connected white pixels to that pixel is less than a first threshold T1. If this is true (YES in step 803), then step 804 makes all the connected pixels black. If this is false (NO in step 803), then the color of these pixels is unchanged.

In either case, step 805 identifies each black pixel. Step 806 performs a watershed fill operation to connect all the 8-connected black pixels to the black pixels identified in step 805.

Step 807 checks to determine whether the number of 8-connected black pixels to that pixel is less than a second threshold T2. If this is true (YES in step 807), then step 808 makes all the connected pixels white. If this is false (NO in step 807), then the color of these pixels is unchanged. In either case, the ridge removal is complete in step 809.

The steps included in FIG. 8 totally eliminate the noise induced by the thresholding operation. FIG. 9 illustrates a comparison of the input image illustrated in FIG. 9A, the thresholded image illustrated in FIG. 9B and the cleaned image after watershed fill operations illustrated in FIG. 9C.

What is claimed is:

1. A method of filtering a fingerprint image comprising the steps of:
    receiving an input fingerprint image;
    separating the input fingerprint image into plural, distinct segments, each segment having ridge-valley lines within a predetermined range of angles;
    directionally filtering each of said segments with a corresponding directional filter generally perpendicular to said predetermined range of angles of said segment;
    assembling said directionally filtered segments into a reassembled image;
    after said reassembling step, thresholding said fingerprint image by
        detecting all ridge-valley edge pixels,
        averaging pixel values of said detected edge pixels,
        setting each pixel in said reassembled image to foreground if said corresponding pixel value is greater than said average edge pixel value, and
        setting each pixel in said reassembled image to background if said corresponding pixel value is less than said average edge pixel value;
    after said thresholding step, watershed filling said background pixels including
        for each background pixel identifying other background pixels horizontally or vertically adjacent, and
        replacing each background pixel with a foreground pixel if said identified background pixels are less in number than a predetermined number; and
    outputting said reassembled, thresholded and watershed filled image.

2. The method of filtering a fingerprint image of claim 1, wherein:
    said step of directionally filtering each of said segments includes for each segment
        grouping pixels into groups parallel to the ridge-valley lines;
        averaging pixel values of pixels within each group, and replacing each pixel in each group with said averaged pixel value of said group.

3. The method of filtering a fingerprint image of claim 1, wherein:
    said step of directionally filtering each of said segments includes for each segment replacing each pixel value with a weighted sum of surrounding pixel values, each weighted sum favoring neighboring pixels along said ridge-valley line of said segment and disfavoring neighboring pixels perpendicular to said ridge-valley line of said segment.

4. A method of filtering a fingerprint image comprising the steps of:

receiving an input fingerprint image;

separating the input fingerprint image into plural, distinct segments, each segment having ridge-valley lines within a predetermined range of angles;

directionally filtering each of said segments with a corresponding directional filter generally perpendicular to said predetermined range of angles of said segment;

assembling said directionally filtered segments into a reassembled image;

after said reassembling step, thresholding said fingerprint image by detecting all ridge-valley edge pixels, averaging pixel values of said detected edge pixels, setting each pixel in said reassembled image to foreground if said corresponding pixel value is greater than said average edge pixel value, and setting each pixel in said reassembled image to background if said corresponding pixel value is less than said average edge pixel value;

after said thresholding step, watershed filling said foreground pixels including for each foreground pixel identifying other foreground pixels horizontally, vertically or diagonally adjacent, and replacing each foreground pixel with a background pixel if said identified foreground pixels are less in number than a predetermined number; and outputting said reassembled, thresholded and watershed filled image.

5. The method of filtering a fingerprint image of claim 4, wherein:

said step of directionally filtering each of said segments includes for each segment grouping pixels into groups parallel to the ridge-valley lines;

averaging pixel values of pixels within each group, and replacing each pixel in each group with said averaged pixel value of said group.

6. The method of filtering a fingerprint image of claim 4, wherein:

said step of directionally filtering each of said segments includes for each segment replacing each pixel value with a weighted sum of surrounding pixel values, each weighted sum favoring neighboring pixels along said ridge-valley line of said segment and disfavoring neighboring pixels perpendicular to said ridge-valley line of said segment.

* * * * *